(12) United States Patent
Kang et al.

(10) Patent No.: US 9,290,242 B2
(45) Date of Patent: Mar. 22, 2016

(54) LOW ENERGY CONSUMING GARBAGE PATCH GATHERING AND CLASSIFYING EQUIPMENT AND METHOD USING CATAMARAN

(75) Inventors: Hee Jin Kang, Gyeryong (KR); Myung Soo Shin, Daejeon (KR); Dong-Kon Lee, Daejeon (KR); Jin Choi, Gyeryong (KR)

(73) Assignee: KOREA INSTITUTE OF OCEAN SCIENCE & TECHNOLOGY, Ansan (KR)

( * ) Notice: Subject to any disclaimer, the term of this patent is extended or adjusted under 35 U.S.C. 154(b) by 0 days.

(21) Appl. No.: 14/425,619

(22) PCT Filed: Sep. 4, 2012

(86) PCT No.: PCT/KR2012/007083
§ 371 (c)(1),
(2), (4) Date: Apr. 7, 2015

(87) PCT Pub. No.: WO2014/038732
PCT Pub. Date: Mar. 13, 2014

(65) Prior Publication Data
US 2015/0251733 A1    Sep. 10, 2015

(30) Foreign Application Priority Data

Sep. 4, 2012   (KR) .................... 10-2012-0097645

(51) Int. Cl.
| | |
|---|---|
| B63B 35/32 | (2006.01) |
| B29B 17/02 | (2006.01) |
| B03B 7/00 | (2006.01) |
| B03C 7/00 | (2006.01) |
| B29B 17/04 | (2006.01) |
| B63B 59/06 | (2006.01) |

(Continued)

(52) U.S. Cl.
CPC ............. *B63B 35/32* (2013.01); *B03C 7/003* (2013.01); *B03C 7/006* (2013.01); *B29B 17/0036* (2013.01); *B29B 17/02* (2013.01); *B29B 17/0412* (2013.01); *B63B 59/06* (2013.01); *E02B 15/00* (2013.01); *B29B 2017/0094* (2013.01); *B29B 2017/0203* (2013.01); *B29B 2017/0265* (2013.01); *B29B 2017/0468* (2013.01); *B29K 2105/26* (2013.01); *B63B 1/10* (2013.01); *E02B 15/048* (2013.01); *Y02W 30/527* (2015.05); *Y02W 30/622* (2015.05)

(58) Field of Classification Search
None
See application file for complete search history.

(56) References Cited

FOREIGN PATENT DOCUMENTS

| | | |
|---|---|---|
| JP | 08-071453 A | 3/1996 |
| JP | 11-114452 A | 4/1999 |

(Continued)

OTHER PUBLICATIONS

International Search Report for PCT/KR2012/007083 filed on Sep. 4, 2012.

*Primary Examiner* — Mary F Theisen

(57) ABSTRACT

By mooring or slowly moving the catamaran in a current through which a garage patch formed of disused plastic particles over than 90% is drifting, a heap of the marine debris flows into the bow of the catamaran and then is smashed. While the disused plastic particles that have been smashed at the bow of the catamaran is moving from the bow toward the stern by way of the tunnel between hulls of the catamaran, the plastic particles are first classified by differences of densities. These first classified plastic particles are collected and then transferred into a narrow and long inside of the catamaran, being finally classified by a triboelectrostatic action. Thereafter, these finally classified plastic particles are made to be pallets which are to be transported to a land facility for recycling or abandoning them.

10 Claims, 6 Drawing Sheets

(51) Int. Cl.
*E02B 15/00* (2006.01)
*B63B 1/10* (2006.01)
*B29B 17/00* (2006.01)
*E02B 15/04* (2006.01)
*B29K 105/26* (2006.01)

(56) References Cited

FOREIGN PATENT DOCUMENTS

| KR | 20-1997-0001624 U | 1/1997 |
| KR | 10-2009-0104338 A | 10/2009 |
| KR | 10-2010-0038501 A | 4/2010 |

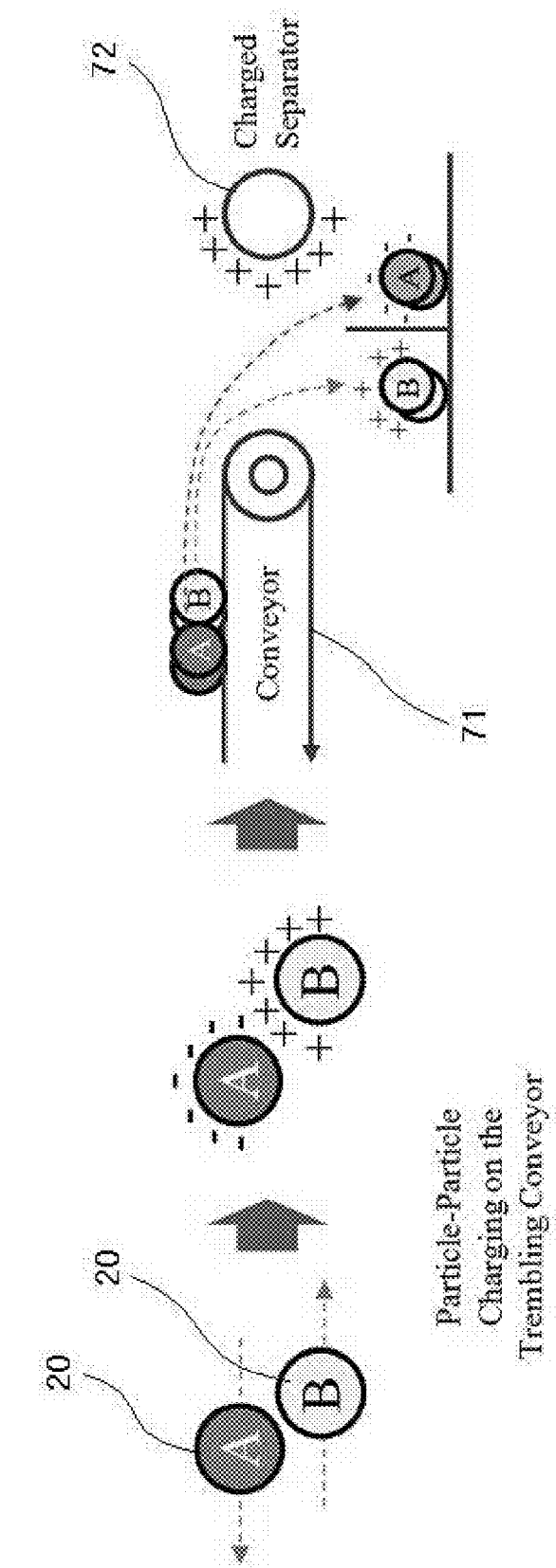

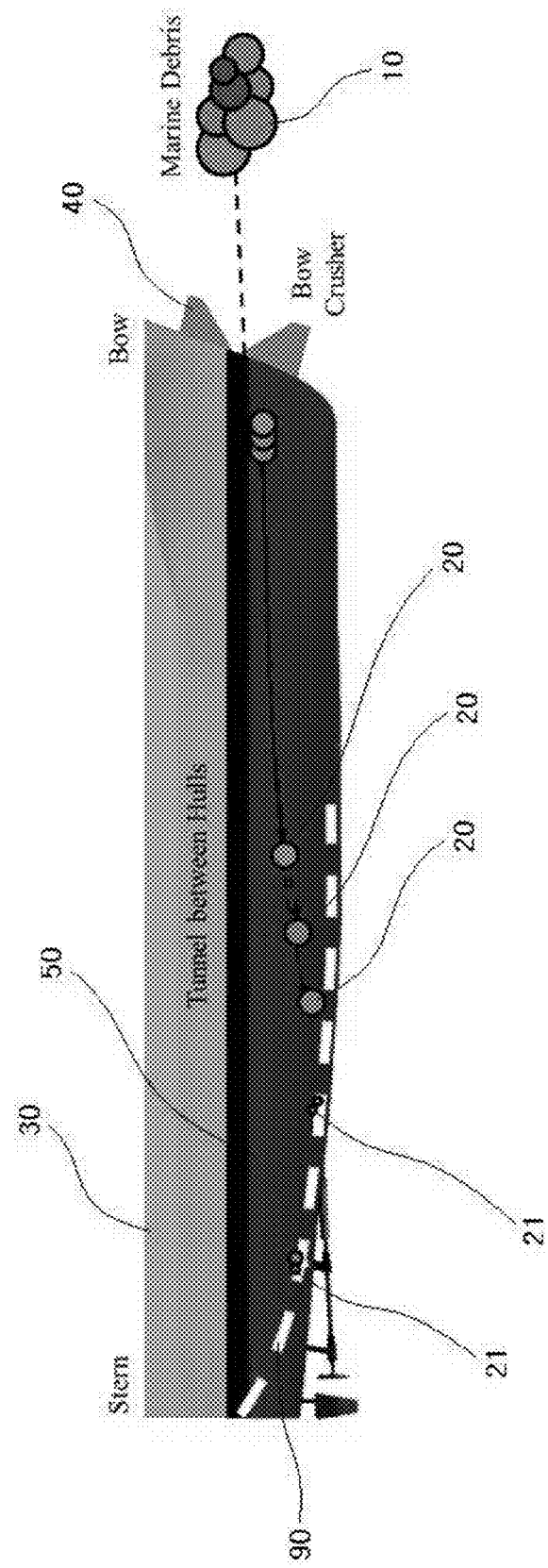

LOW ENERGY CONSUMING GARBAGE PATCH GATHERING AND CLASSIFYING EQUIPMENT AND METHOD USING CATAMARAN

CROSS-REFERENCE TO RELATED APPLICATIONS

The present application is a National Stage of International Patent Application No. PCT/KR2012/007083 filed on Sep. 4, 2012, which claims priority under 35 U.S.C. 119(a) to Korean Application No. 10-2012-0097645, filed on Sep. 4, 2012, in the Korean Intellectual Property Office, which is incorporated by reference in its entirety as set forth in full.

BACKGROUND

1. Technical Field

The inventive concept relates generally to technology for resolving garbage patches made up of garbage dumped into the sea, and particularly to low energy consuming garbage patch gathering and classifying equipment and a method using a catamaran.

2. Related Art

Garbage patches are typically made up of garbage drifting along currents about in the sea after being dumped from the land and vessels, 90 percentage of which is known as consisting of disused plastics (Tarmanaha, M. and Moore, C., 2010). Some garbage patches are estimated as large as the American continent. As a large amount of fragile particles of disused plastics thereof is steadily contaminating marine environments, being inadvertently taken into marine creatures, there could be a lot of effects even directly to human lives such as exhaustion and pollution of fisheries as well as disturbance in marine ecosystems.

As for the troubles due to garbage patches, such an extraordinary amount of garbage is widely distributed over a vast area as large as the American continent and into a considerable depth about several meters, so that there could be a limit to gathering them. Moreover, because of a high cost in gathering and transporting the garbage to the land for recycling or abandoning them, it is still difficult to resolve the practical barriers while those problems are becoming heavier.

SUMMARY

Accordingly, to resolve the aforementioned garbage patch problems being deteriorated as long as time, embodiments of the inventive concept are directed to low energy consuming garbage patch gathering and classifying equipment and a method using a catamaran in marine environments.

In an aspect, a low energy consuming garbage patch gathering and classifying equipment using a catamaran, which is mooring or moving on a current through which a garbage patch is drifting, may include: a bow crusher installed at a bow of the catamaran, and configured to collect and smash marine debris that are approaching toward the bow of the catamaran; a density-based classifier configured to form a tunnel between hulls of the catamaran, and enable disused plastic particles, which have been smashed by the bow crusher, to be naturally classified with different water depths and move ranges by density while drifting through a current in the tunnel between hulls of the catamaran; a collector, as a net-type structure installed at the density-based classifier, configured to collect the disused plastic particles, which are differently classified in water depth and move range by density while passing through the density-based classifier, in accordance with differences of densities; and a triboelectrostatic classifier installed within or out of the hull of the catamaran, and configured to enable the disused plastic particles, which have been caught by the collector, to be charged in different electrodes while being transferred with friction through a conveyor belt that are trembling and then enable the disused plastic particles to be classified by differences of the charged electrodes.

In another aspect, a method operable in low energy consuming garbage patch gathering and classifying equipment using a catamaran including a bow crusher, a density-based classifier, a collector, a triboelectrostatic classifier, a washer, a stern retriever, and a pellet former, the method may include the steps of: inducing marine debris to flow into a bow of the catamaran while the catamaran is mooring or moving in a current through which a garbage patch is drifting; collecting and smashing the marine debris, which is approaching toward the bow of the catamaran, in the bow crusher; enabling disused plastic particles, which have been smashed by the bow crusher, to be naturally classified with different water depths and move ranges by density in the density-based classifier while drifting through a current in the tunnel between hulls of the catamaran; collecting the disused plastic particles, which are differently classified in water depth and move range by density in the collector while passing through the density-based classifier, in accordance with differences of densities; and enabling the disused plastic particles, which have been caught by the collector, to be charged in different electrodes while being transferred with friction through a conveyor belt that are trembling, by the triboelectrostatic classifier, and then enabling the disused plastic particles to be classified by differences of the charged electrodes.

A further understanding of the nature and advantages of the inventive concept herein may be realized by reference to the remaining portions of the specification and the attached drawings.

BRIEF DESCRIPTION OF THE DRAWINGS

The inventive concept is illustrated by way of example, and not by way of limitation, in the figures of the accompanying drawings and in which like reference numbers refer to similar elements and in which:

FIG. 5 illustrates an operation mechanism in which disused plastic particles are classified by differences of charged electrodes, while the plastic particles are passing through the triboelectrostatic classifier, according to embodiments of the inventive concept; and FIG. 6 schematically illustrates a configuration of a catamaran, in which a stern retriever is installed, according to embodiments of the inventive concept.

DESCRIPTION OF EMBODIMENTS

Hereinafter, various exemplary embodiments will now be described more fully with reference to the accompanying drawings in which some exemplary embodiments are shown. However, specific structural and functional details disclosed herein are merely representative for purposes of describing exemplary embodiments of the inventive concept.

Embodiments of the inventive concept, for resolving the aforementioned garbage patch problems being deteriorated as long as time, are directed to low energy consuming garbage patch gathering and classifying equipment and a method using a catamaran in marine environments.

For the purpose of the aforementioned direction, embodiments of the inventive concept provides to low energy consuming garbage patch gathering and classifying equipment and a method using a catamaran. Equipment according to embodiments of the inventive concept may be comprised of a bow crusher 40, a density-based classifier 50, a collector 60, and a triboelectrostatic classifier 70. Various aspects will be hereinafter described in detail with reference to the attached drawings.

Figure 1:
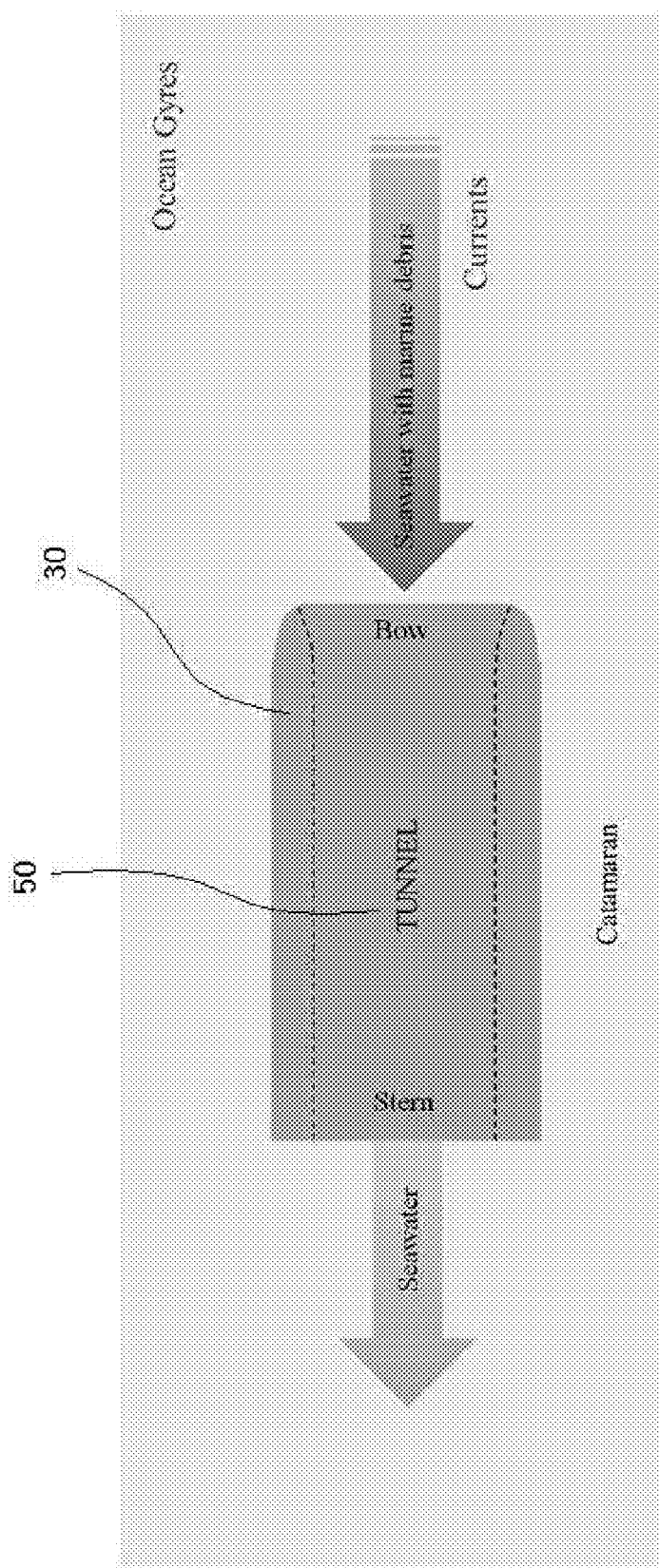
FIG. 1 schematically illustrates a basic feature according to the inventive concept.

FIG. 1 schematically illustrates a basic feature according to the inventive concept. If a catamaran 30 is mooring or slowly moving on a current through which garbage patch is drifting, marine debris 10 flows into the bow of the catamaran 30, being strained while moving along a tunnel between hulls, and finally removed at the stern of the catamaran 30. Consequently, a clean current flows out of the stern.

In more detail with reference to FIG. 1, by mooring or slowly moving the catamaran 30 in a current through which a garage patch formed of disused plastic particles over than 90% is drifting, a heap of the marine debris 10 flows into the bow of the catamaran 30 and then is smashed. While the disused plastic particles (20 of FIG. 2) that have been smashed at the bow of the catamaran 30 is moving from the bow toward the stern by way of the tunnel between hulls of the catamaran 30, the plastic particles 20 are first classified by differences of densities. These first classified plastic particles 20 are collected and then transferred into a narrow and long inside of the catamaran 30, being finally classified by a triboelectrostatic action. Thereafter, these finally classified plastic particles 20 are made to be pallets which are to be transported to a land facility for recycling or abandoning them. During this, the marine debris 10 is finally removed at the stern of the catamaran 30, resulting in a clean current that flows out of the stern.

Figure 2:
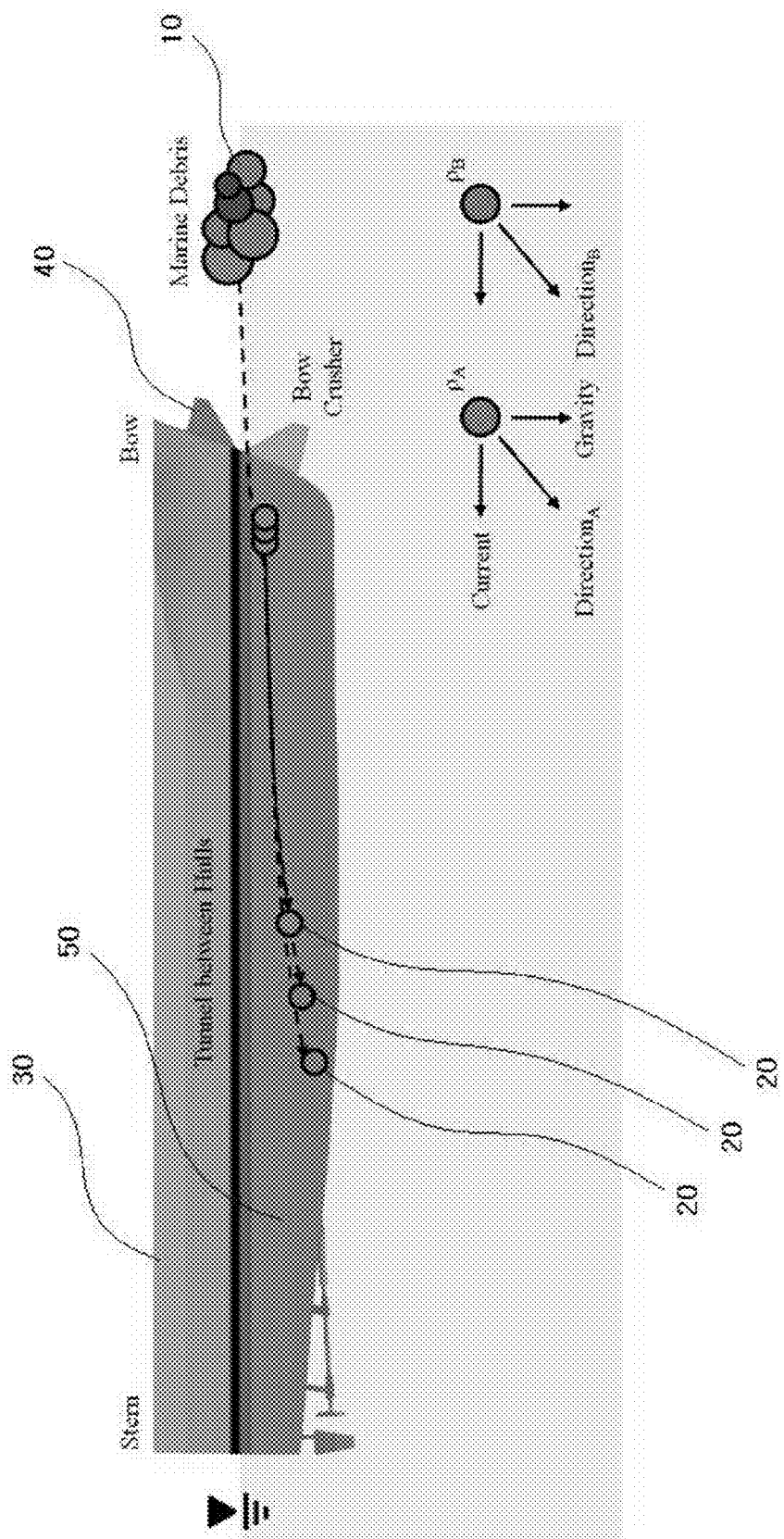
FIG. 2 schematically illustrates a configuration of a catamaran, in which a bow crusher is installed, according to embodiments of the inventive concept, and a feature of naturally classifying disused plastic particles with varying water depth and move range along density while the plastic particles are transferring through a current in the density-based classifier.

FIG. 2 schematically illustrates a configuration of a catamaran 30, in which a bow crusher 40 is installed, and a feature of naturally classifying disused plastic particles 20 with varying water depths and move ranges along density while the plastic particles 20 are transferring through a current in the density-based classifier.

The bow crusher 40 is installed at the bow of the catamaran 30 (FIG. 2). Meanwhile, in an embodiment, the catamaran 30 may act to induce the marine debris 10 to flow into the bow while it is mooring or slowly moving on a current through which the garbage patch is drifting (FIG. 1). During this, the bow crusher 40 may collect and smash the marine debris 10 which is approaching toward the bow of the catamaran 30 (FIG. 2). Here, most of the marine debris 10 smashed by the bow crusher 40 may consist of the disused plastic particles 20.

The density-based classifier 50 may operate to utilize the tunnel between hulls of the catamaran 30 (FIG. 1, FIG. 2). The disused plastic particles 20 smashed by the bow crusher 40 are moving in the density-based classifier 50, which is placed in connection with the read side of the bow crusher 40, i.e., in the tunnel between hulls of the catamaran 30, along a current and then naturally classified while differentiating in water depth and move range by density (FIG. 2). In other words, considering that among the disused plastic particles 20, particles with higher density are inclined to sink deeper and move shorter, while moving, than particles with lower density, the density-based classifier 50 may function to classify the disused plastic particles 20 by density. These plastic particles 20 first classified into similar kinds of densities after passing through the density-based classifier 50 will be further classified into kinds of electrodes charged by electrodes, but similar in density, while passing through the triboelectrostatic classifier that will be described later.

Figure 3:
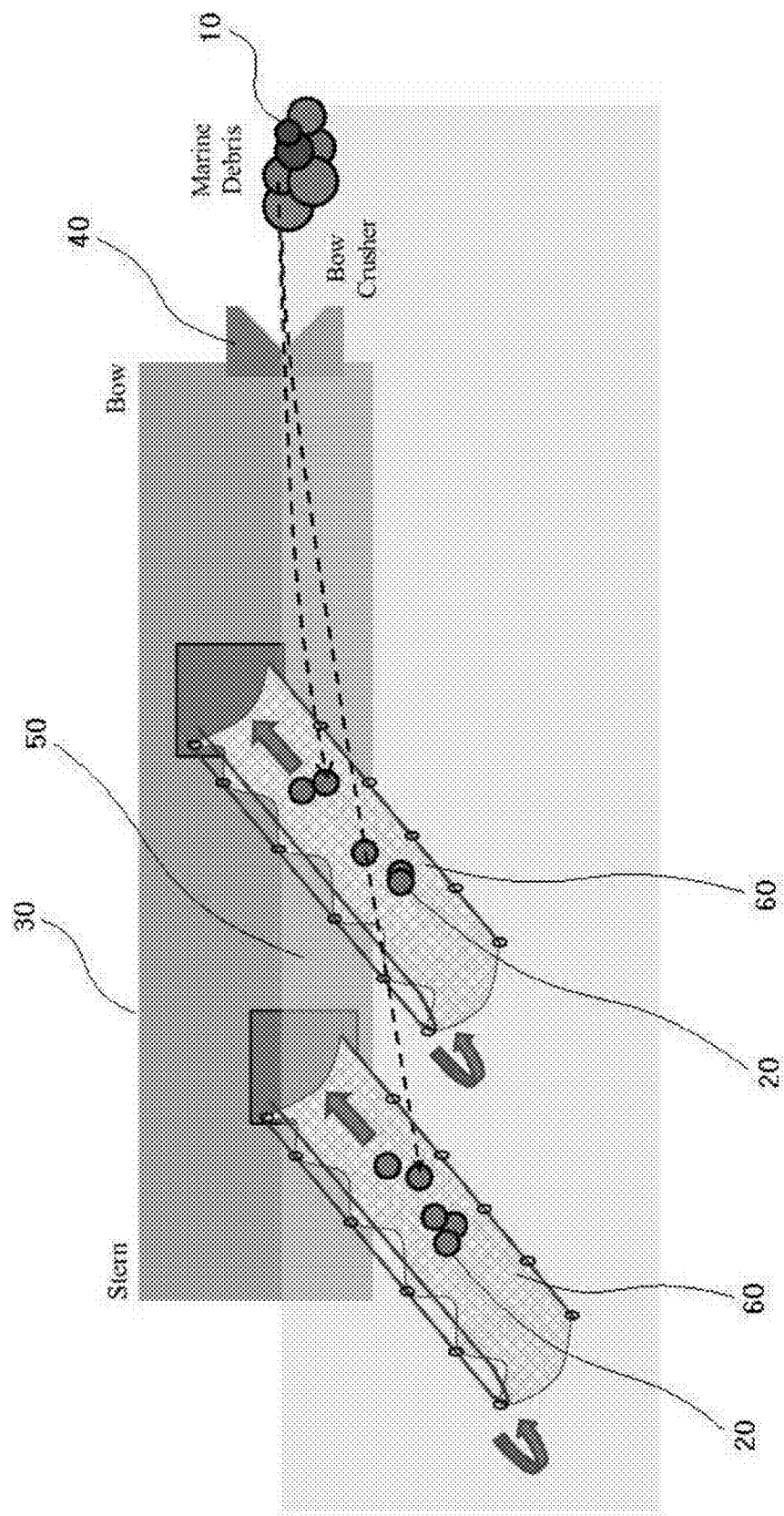
FIG. 3 schematically illustrates a configuration of a collector to collect disused plastic particles classified by density, while the plastic particles are passing through the density-based classifier, in accordance with embodiments of the inventive concept.

FIG. 3 schematically illustrates a configuration of the collector 60 to gather the disused plastic particles 20 classified by density while the plastic particles 20 are passing through the density-based classifier 50.

The collector 60 may be a net-type structure which is installed in the density-based classifier 50 (FIG. 3). In more detail, the collector 60 may be a net-type collector which is installed on the hull surface of the catamaran 30 in the tunnel between hulls of the catamaran 30. The collector 60 may act to collect the disused plastic particles 20, which are classified into different depths and ranges while passing through the tunnel between hulls of the catamaran 30, by density. In a preferred embodiment of the inventive concept, to effectively collect the disused plastic particles 20 by density, the collector 60 may be disposed in multiplicity along water depths and move ranges, enabling the disused plastic particles 20 to be caught many times at corresponding locations (FIG. 3).

Figure 4:
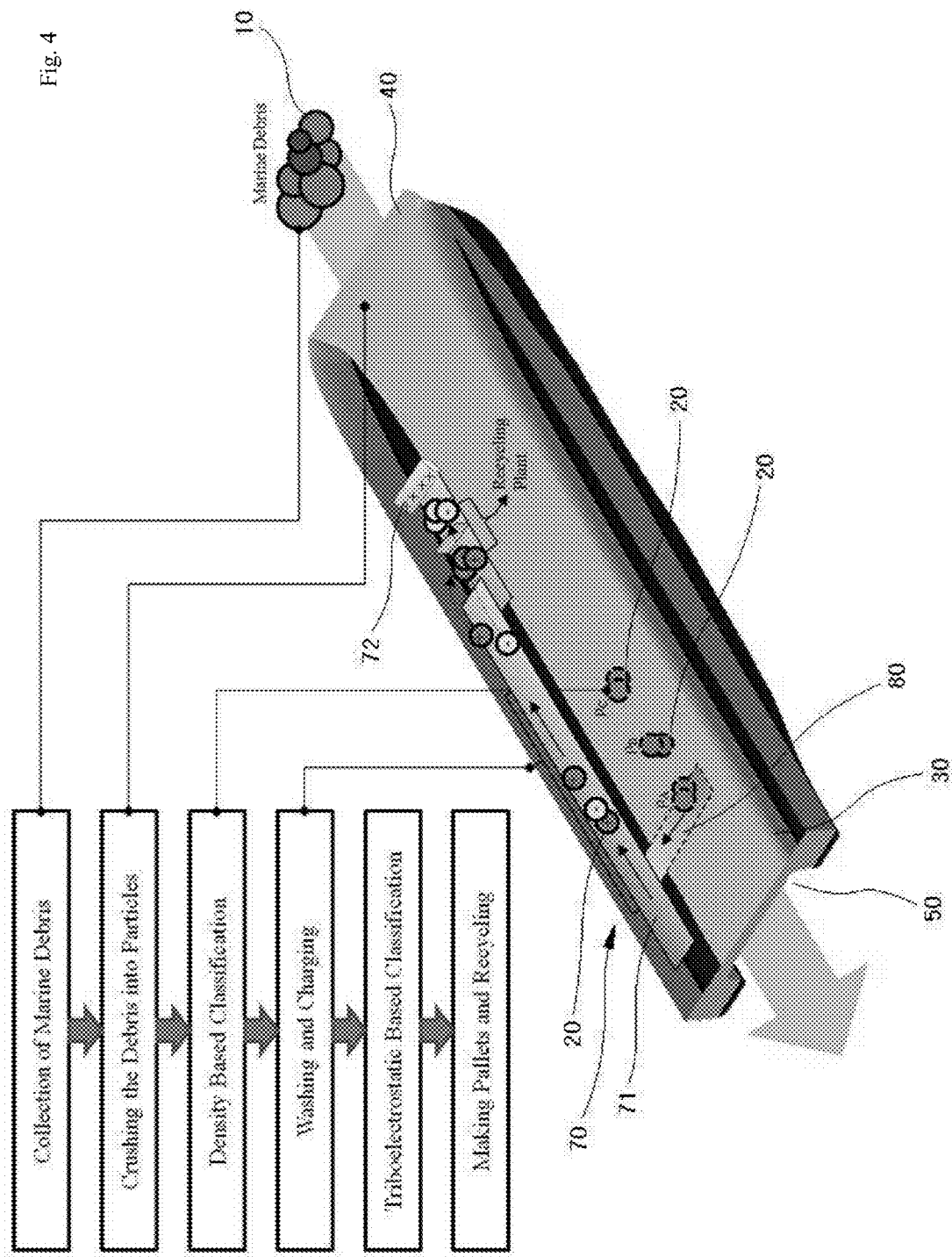
FIG. 4 schematically illustrates a configuration of a catamaran, in which a triboelectrostatic classifier is installed, according to embodiments of the inventive concept.

FIG. 4 schematically illustrates a configuration of the catamaran 30, in which the triboelectrostatic classifier 70 is installed, and FIG. 5 illustrates an operation mechanism in which disused plastic particles 20 are classified by differences of charged electrodes while the plastic particles 20 are passing through the triboelectrostatic classifier 70.

The triboelectrostatic classifier 70 may be installed in the inside or outside of the catamaran 30. As noticed, FIG. 4 shows that the triboelectrostatic classifier 70 is installed in the hull of the catamaran 30. The triboelectrostatic classifier 70 may be driven with a conveyor belt 71 which is installed along the hull of the catamaran 30 that is extending lengthwise. In the triboelectrostatic classifier 70, the disused plastic particles 20 gathered by the collector 60 are transferred with friction through the conveyor belt 71 which is trembling, and thereby charged with different electrodes each other. Due to the differences of the charged electrodes, the plastic particles 20 may be classified once again. Hereinafter, the operation of the triboelectrostatic classifier 70 will be more detailed with reference to FIGS. 4 and 5.

Referring to FIG. 4, the disused plastic particles 20 gathered in density types of $\rho A$, $\rho B$, and $\rho C$ by the collected densities are entered into the triboelectrostatic classifier 70. The disused plastic particles 20 entered into the triboelectrostatic classifier 70 are transferred through the conveyor belt 71 which is trembling. Referring to FIG. 5, while being transferred on the trembling conveyor belt 71, the disused plastic particles 20, e.g. particles A and B, continue to rub each other. As a result, the disused plastic particles 20 are differentiated in polarities of charges among them if their materials are different but similar in density, i.e., differentiated in charged electrodes such as A− and B+. Then, the disused plastic particles 20 are divisionally crowded into the electrodes A− and B+ respective thereto by means of a charged separator 72. In the embodiment shown in FIG. 5, as the polarity of the charged separator 72 is positive (+), negative-polarized members of the disused plastic particles 20 are crowded around near to the charged separator 72 (by electrical attraction) while positive-polarized members of the disused plastic particles 20 are crowded far from the charged separator 72 (by electrical repulsion). If the charged separator 72 is set to be in negative polarity (−), the disused plastic particles 20 may be enforced to be in the reverse state. In this way, the disused plastic particles 20 are first classified by differences of densities through the density-based classifier 50 and then more finely classified again by differences of electrodes through the triboelectrostatic classifier 70.

On the other hand, in a preferred embodiment, the equipment may further include a washer 80 which removes salt from the disused plastic particles 20 by washing and then dries them up before the particles 20 are entered into the triboelectrostatic classifier 70 (FIG. 4). This is because the disused plastic particles 20 need to be excluded from salt and dried up for the subsequent charging effect by friction in the triboelectrostatic classifier 70. The washer 80 may be installed within or out of the hull of the catamaran 30.

Additionally, in a preferred embodiment, the equipment may further include a pellet former (not shown) for recycling or abandoning the disused plastic particles 20, which have been finally classified, in kinds. The pellet former may be installed within or out of the hull of the catamaran 30. The disused plastic particles 20 are made into pallets by the pellet former, and then the pellets are loaded in the catamaran 30 and transported to a land facility for the next treatment.

Summarily, after sequential processes on the sea, i.e. after completing the procedure of collecting the marine debris 10, classifying the disused plastic particles 20 which are crushed, and finally forming the disused plastic particles 20 into pallets which are easy in transportation, the pellets as resultant matters are transported to a land facility. According to embodiments of the inventive concept, it is possible to efficiently gather and classify the marine debris 10 in lower energy consumption, and further reduce a cost for collecting the marine debris 10 and transporting them to a land facility for recycling or abandoning. Therefore, the problems of garbage patches becoming worse along time can be effectively resolved to prevent contamination of marine environments and disturbance of ecosystems.

Additionally, in a preferred embodiment, the equipment may further include a stern retriever 90 for recollecting the disused plastic remainder 21 which has not been yet caught by the collector 60 (FIG. 6). The stern retriever 90 is a kind of net-type collection device which is installed on the hull surface at the bottom stern of the catamaran 30. FIG. 6 schematically illustrates a configuration of the catamaran 30 in which the stern retriever 90 is installed. The stern retriever 90 may function to collect the disused plastic remainder 21, which has not been yet caught by the collector 60 ahead thereof, last. Therefore, the disused plastic remainder 21 is prevented from re-drifting to the sea to cause contamination of marine environments, or from being taken into marine creatures to cause disturbance of ecosystems.

In the meantime, the inventive concept may provide a method operable in such a low energy consuming garbage patch gathering and classifying equipment using the catamaran. This method of gathering and classifying marine garbage patch will be now described in steps of operations according to embodiments of the inventive concept. In the following explanation, the components identical to the aforementioned will not be further described.

First step: the catamaran 30 induces the marine debris 10 to flow into the bow while mooring or moving on a current through which a garbage patch is drifting.

Second step: the bow crusher 40 collects and smashes the marine debris 10 which is approaching toward the bow of the catamaran 30.

Third step: the density-based classifier 50 enables the disused plastic particles 20, which have been smashed by the bow crusher 40, to be naturally classified by differentiating in water depth and move range depending on densities while drifting through a current in the tunnel between hulls of the catamaran 30.

Fourth step: the collector 60 gathers the disused plastic particles 20, which are classified differently in water depth and move range by density while passing through the density-based classifier 50, in accordance with respective types of densities. During this, to effectively collect the disused plastic particles 20 by density, the collector 60 may be disposed in multiplicity along water depths and move ranges, enabling the disused plastic particles 20 to be caught many times at corresponding locations.

Fifth step: the triboelectrostatic classifier 70 enables the disused plastic particles 20, which have been gathered by the collector 60, to be charged in different electrodes while being transferred with friction through the conveyor belt 71 and to be classified in differences of the charged electrodes. During this, the washer 80 removes salt from the disused plastic particles 20 and then dries the disused plastic particles 20 up before the disused plastic particles 20 are entered into the triboelectrostatic classifier 70.

Sixth step: the pellet former transforms the disused plastic particles 20, which have been finally classified by the triboelectrostatic classifier 70, into pellets for recycling or abandoning then by kinds.

Seventh step: the stern retriever 90 recollects the disused plastic remainder 21 which has not been yet caught by the collector 60.

According to the embodiments of the inventive concept, it may be possible to efficiently gather and classify marine garbage in lower energy, and reduce a cost of transporting the gathered garbage to land facilities for recycling or abandoning them. Therefore, it may result in effective solution about the garbage patch problems that is becoming worse along time, hence preventing contamination of marine environments and disturbance of ecosystems.

The foregoing is illustrative of exemplary embodiments and is not to be construed as limiting thereof. Although a few exemplary embodiments have been described, those skilled in the art will readily appreciate that many modifications are possible in exemplary embodiments without materially departing from the novel teachings and advantages. Accordingly, all such modifications are intended to be included within the scope of this invention as defined in the claims.

What is claimed is:

1. A low energy consuming garbage patch gathering and classifying equipment using a catamaran that is mooring or moving on a current through which a garbage patch is drifting, comprising:
   a bow crusher installed at a bow of the catamaran, and configured to collect and smash marine debris that are approaching toward the bow of the catamaran;
   a density-based classifier configured to form a tunnel between hulls of the catamaran, and enable disused plastic particles, which have been smashed by the bow crusher, to be naturally classified with different water depths and move ranges by density while drifting through a current in the tunnel between hulls of the catamaran;

a collector, as a net-type structure installed at the density-based classifier, configured to collect the disused plastic particles, which are differently classified in water depth and move range by density while passing through the density-based classifier, in accordance with differences of densities; and a triboelectrostatic classifier installed within or out of the hull of the catamaran, and configured to enable the disused plastic particles, which have been caught by the collector, to be charged in different electrodes while being transferred with friction through a conveyor belt that are trembling and then enable the disused plastic particles to be classified by differences of the charged electrodes.

2. The low energy consuming garbage patch gathering and classifying equipment according to claim 1, further comprising:

a washer installed within or out of the hull of the catamaran, and configured to remove salt from the disused plastic particles by washing and dry the disused plastic particles.

3. The low energy consuming garbage patch gathering and classifying equipment according to claim 1, further comprising:

a stern retriever, as a net-type structure installed at a bottom stern of the catamaran, configured to recollect disused plastic remainders that have not been yet caught by the collector.

4. The low energy consuming garbage patch gathering and classifying equipment according to claim 1, further comprising:

a pellet former installed within or out of the hull of the catamaran, and configured to transform the disused plastic particles, which have been finally sorted by the triboelectrostatic classifier, into pellets for recycling or abandoning in kinds.

5. The low energy consuming garbage patch gathering and classifying equipment according to claim 1, wherein the collector is disposed in multiplicity by water depths and move ranges of the disused plastic particles.

6. A method operable in low energy consuming garbage patch gathering and classifying equipment using a catamaran including a bow crusher, a density-based classifier, a collector, a triboelectrostatic classifier, a washer, a stern retriever, and a pellet former, the method comprising:

inducing marine debris to flow into a bow of the catamaran while the catamaran is mooring or moving in a current through which a garbage patch is drifting;

collecting and smashing the marine debris, which is approaching toward the bow of the catamaran, in the bow crusher;

enabling disused plastic particles, which have been smashed by the bow crusher, to be naturally classified with different water depths and move ranges by density in the density-based classifier while drifting through a current in the tunnel between hulls of the catamaran;

collecting the disused plastic particles, which are differently classified in water depth and move range by density in the collector while passing through the density-based classifier, in accordance with differences of densities; and enabling the disused plastic particles, which have been caught by the collector, to be charged in different electrodes while being transferred with friction through a conveyor belt that are trembling, by the triboelectrostatic classifier, and then enabling the disused plastic particles to be classified by differences of the charged electrodes.

7. The method according to claim 6, further comprising:
washing the disused plastic particles by the washer to remove salt from the disused plastic particles and dry the disused plastic particles.

8. The method according to claim 7, further comprising:
retrieving disused plastic remainders, which have not been yet caught by the collector, by the stern retriever.

9. The method according to claim 6, further comprising:
transforming the disused plastic particles, which have been finally sorted by the triboelectrostatic classifier, into pellets by the pellet former for recycling or abandoning in kinds.

10. The method according to claim 6, wherein the collector is disposed in multiplicity by water depths and move ranges of the disused plastic particles.

* * * * *